United States Patent
Bouk et al.

(10) Patent No.: US 10,134,387 B2
(45) Date of Patent: Nov. 20, 2018

(54) IMAGE DISPLAY APPARATUS, METHOD FOR DRIVING THE SAME, AND COMPUTER READABLE RECORDING MEDIUM

(71) Applicant: SAMSUNG ELECTRONICS CO., LTD., Suwon-si, Gyeonggi-do (KR)

(72) Inventors: Chan-shik Bouk, Incheon (KR); Kyung-mi Park, Suwon-si (KR); Nam-yeong Kwon, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 14/922,294

(22) Filed: Oct. 26, 2015

(65) Prior Publication Data

US 2016/0133248 A1 May 12, 2016

(30) Foreign Application Priority Data

Nov. 12, 2014 (KR) ........................ 10-2014-0157427

(51) Int. Cl.
| | |
|---|---|
| *G10L 15/02* | (2006.01) |
| *G10L 15/00* | (2013.01) |
| *G06F 3/16* | (2006.01) |
| *G10L 15/22* | (2006.01) |
| *G10L 15/187* | (2013.01) |

(52) U.S. Cl.
CPC .............. *G10L 15/02* (2013.01); *G06F 3/167* (2013.01); *G10L 15/005* (2013.01); *G10L 15/22* (2013.01); *G10L 15/187* (2013.01); *G10L 2015/025* (2013.01); *G10L 2015/223* (2013.01)

(58) Field of Classification Search
CPC .......... G06F 3/167; G10L 15/26; G10L 15/18
See application file for complete search history.

(56) References Cited

U.S. PATENT DOCUMENTS

| 6,983,248 B1 | 1/2006 | Tahara et al. |
|---|---|---|
| 8,155,956 B2 | 4/2012 | Cho et al. |
| (Continued) | | |

FOREIGN PATENT DOCUMENTS

| JP | 2010-9446 | 1/2010 |
|---|---|---|
| JP | 2013-50742 | 3/2013 |
| (Continued) | | |

OTHER PUBLICATIONS

Extended European Search Report dated Apr. 21, 2016 in European Patent Application No. 15193050.0.

*Primary Examiner* — Douglas Godbold
*Assistant Examiner* — Mark Villena
(74) *Attorney, Agent, or Firm* — Staas & Halsey LLP

(57) ABSTRACT

An image display apparatus, a method for driving the same, and a computer readable recording medium are provided. The image display apparatus includes a speech acquirer configured to acquire a speech command created by a user, a speech recognition executor configured to acquire text information which has a phonetic symbol that is the same as or similar to a phonetic symbol of a text-based recognition result corresponding to the acquired speech command and is expressed in a form that is different from a form of the text-based recognition result, and an operation performer configured to perform an operation corresponding to the acquired text information.

13 Claims, 10 Drawing Sheets

(56) References Cited

U.S. PATENT DOCUMENTS

| | | | |
|---|---|---|---|
| 9,275,635 B1* | 3/2016 | Beaufays | G10L 15/32 |
| 2003/0154077 A1 | 8/2003 | Tahara et al. | |
| 2004/0193416 A1* | 9/2004 | Emonts | G10L 15/187 |
| | | | 704/251 |
| 2004/0210438 A1* | 10/2004 | Gillick | G10L 15/005 |
| | | | 704/254 |
| 2005/0043067 A1 | 2/2005 | Odell et al. | |
| 2006/0206327 A1* | 9/2006 | Hennecke | G10L 15/26 |
| | | | 704/251 |
| 2007/0208561 A1 | 9/2007 | Choi et al. | |
| 2008/0113689 A1* | 5/2008 | Bailey | H04M 1/6066 |
| | | | 455/569.1 |
| 2009/0271199 A1* | 10/2009 | Agapi | G10L 15/22 |
| | | | 704/251 |
| 2009/0281791 A1* | 11/2009 | Li | G06F 17/2755 |
| | | | 704/9 |
| 2010/0250250 A1* | 9/2010 | Wiggs | G10L 15/32 |
| | | | 704/235 |
| 2011/0275037 A1* | 11/2011 | Alghamdi | G09B 19/06 |
| | | | 434/157 |
| 2011/0307254 A1* | 12/2011 | Hunt | G10L 15/26 |
| | | | 704/235 |
| 2011/0313773 A1* | 12/2011 | Yamada | G06F 17/30743 |
| | | | 704/270 |
| 2013/0006629 A1* | 1/2013 | Honda | G06F 17/30681 |
| | | | 704/236 |
| 2013/0090921 A1* | 4/2013 | Liu | G10L 15/22 |
| | | | 704/10 |
| 2013/0132094 A1* | 5/2013 | Lim | G10L 15/22 |
| | | | 704/275 |
| 2013/0325449 A1* | 12/2013 | Levien | G10L 15/30 |
| | | | 704/201 |
| 2014/0095143 A1* | 4/2014 | Jan | G06F 17/2223 |
| | | | 704/2 |
| 2014/0163975 A1 | 6/2014 | Lee et al. | |
| 2015/0081293 A1* | 3/2015 | Hsu | G10L 15/26 |
| | | | 704/235 |
| 2015/0112684 A1* | 4/2015 | Scheffer | G10L 17/14 |
| | | | 704/257 |
| 2015/0212791 A1* | 7/2015 | Kumar | G06F 3/167 |
| | | | 715/728 |
| 2015/0228273 A1* | 8/2015 | Serban | G10L 15/18 |
| | | | 704/254 |

FOREIGN PATENT DOCUMENTS

| | | |
|---|---|---|
| KR | 10-2000-0040572 | 7/2000 |
| KR | 2002-0039811 | 5/2002 |
| KR | 10-2009-0066106 | 6/2009 |
| KR | 10-2012-0113717 | 10/2012 |
| KR | 10-2014-0022320 | 2/2014 |
| KR | 10-1364774 | 2/2014 |

* cited by examiner

IMAGE DISPLAY APPARATUS, METHOD FOR DRIVING THE SAME, AND COMPUTER READABLE RECORDING MEDIUM

CROSS-REFERENCE TO RELATED APPLICATIONS

This application claims priority under 35 U.S.C. § 119(a) to Korean Patent Application No. 10-2014-0157427, filed on Nov. 12, 2014, in the Korean Intellectual Property Office, the disclosure of which is incorporated herein by reference.

BACKGROUND

1. Field

The present disclosure relates to an image display apparatus, a method for driving the same, and a computer readable recording medium, and more particularly to an image display apparatus, a method for driving the same, and a computer readable recording medium, which can normalize a format of the result of speech recognition to perform an operation of a device, such as a TV or a portable phone.

2. Description of the Related Art

Interactions between human and device have evolved toward convenience and nature. Among them, speech recognition is the most intuitive and easiest interaction that human can use. Spontaneous speech recognition has been used in various devices since it can recognize various vocabularies and interactive sentences. However, in the case of using a spontaneous speech recognition engine, a great variety of vocabularies are output, and the recognition result may sometimes come out in a manner that the recognition result has the same pronunciation and the same semantic as the title of a function or content that is actually executed in a device, but has a different language, for example, English other than Korean. This is because although the speech has been properly recognized, the device matches the semantic that is in the form of a text with the title of the function or content. In this case, the function may not be performed. In order to solve this problem, post-processing technologies using correlations and parallel corpora have been proposed. That is, various technologies related to post-processing for improvement of a speech recognition error rate and a recognition rate.

Most of such technologies are related to methods to improve the recognition rate and a recognition error rate using a corpus DB in which errors and correct answers match each other or a system that extracts features from an input speech and determines correlations between the input speech and registered words. Such technologies can improve accuracy of a sentence created by a user or solve an error of the recognition result. However, in the case of using the spontaneous speech recognition engine, the recognition result may come out, due to the various vocabularies, in a manner that the recognition result has the same name and pronunciation as the same function or the same content that actually operates, but has a different format. In this case, even if the error of a text is corrected, the function that is desired by a user may not be performed.

For example, Korean Unexamined Patent Application Publication No. 10-1998-0056234 entitled "Post-processing speech recognition method using correlations" discloses a post-processing method of a speech recognition system. Using this technology, if the result of speech input through a microphone is not found in a registered command set, correlations are registered through comparison of distances between a specific pattern and patterns of currently registered words. Accordingly, in the case where the same speech is input later, recognition thereof becomes possible since the corresponding speech has been registered through the correlations.

Further, Korean Unexamined Patent Application Publication No. 10-2012-0141972 entitled "Method and apparatus for correcting errors of speech recognition" discloses an error correction technology using parallel corpora in a speech recognition system. According to this technology, a correct answer corpus and a parallel corpus including a correct answer pair and an error pair as the recognition result are generated. If an erroneous recognition result comes out, a recognition error portion is found from the result, and the result is replaced by the correct answer pair that matches in the parallel corpus.

With the development of the spontaneous speech recognition function, the spontaneous speech engine, that is, the speech recognition that uses the recognition result provided from an external server, can recognize various vocabularies and words. However, as an adverse reaction thereof, the recognition result may come out in a state where the format of the functions used in the device differs from the format of the spontaneous speech recognition result. Further, as content, such as broadcasts, movies, and music, is continuously produced, and such content can be easily obtained not only in the country in which the content is produced but also abroad through paths, such as Youtub*, even the same content is sometimes expressed in another word or language. Accordingly, in order to accurately recognize and execute the content which has the same pronunciation and the same semantic, but has the title in a different language, for example, English, it is necessary to provide a process of normalizing the format of the speech recognition result, which converts the word into the name of the function or content that is actually executed.

In other words, in order to supplement the problems involved in the related art and to heighten the execution rate of the function or content that a user intends to execute, there has been a need for a technique of normalizing the format of the speech recognition result for the operation of a device using speech recognition, such as a TV.

SUMMARY

The present disclosure has been made to address at least the above problems and/or disadvantages and to provide at least the advantages described below. Accordingly, an aspect of the present disclosure provides an image display apparatus, a method for driving the same, and a computer readable recording medium, which can normalize a format of the result of speech recognition to perform an operation of a device, such as a TV or a portable phone.

According to an aspect of the present disclosure, an image display apparatus includes a speech acquirer configured to acquire a speech command created by a user; a speech recognition executor configured to acquire text information which has a phonetic symbol that is the same as or similar to a phonetic symbol of a text-based recognition result corresponding to the acquired speech command and is expressed in a form that is different from a form of the text-based recognition result; and an operation performer configured to perform an operation corresponding to the acquired text information.

The image display apparatus may include a speech acquirer configured to acquire a speech command created by a user; a speech recognition executor configured to attempt to perform an operation related to the speech command as a recognition result of the acquired speech command, and acquire text information which has a phonetic symbol that is the same as or similar to a phonetic symbol of the recognition result if the operation is unable to be performed as the result of attempt; and an operation performer configured to perform the operation based on the acquired text information.

The image display apparatus may further include a storage configured to store a command set of a plurality of commands and phonetic symbols of the commands, wherein the speech recognition executor acquires the command stored in the storage as the text information.

The image display apparatus may further include a display configured to display content, and a storage configured to store content-related words displayed on the display as commands and to match and store the phonetic symbols with the stored commands, respectively, wherein the speech recognition executor acquires the command that is non-fixedly stored in the storage as the text information.

The image display apparatus may further include a first storage configured to store a command set of commands and phonetic symbols of the commands; and a second storage configured to store content-related words displayed on a display screen as the commands and to match and store the phonetic symbols with the stored commands, respectively, wherein if there is no command that matches the phonetic symbol of the recognition result in at least one of the first storage and the second storage, the text information is acquired by replacing the recognition result using a pronunciation dictionary.

The image display apparatus may further include an exceptional phonetic symbol storage configured to store exceptional phonetic symbol information which has the same pronunciation, but has a phonetic symbol that is differently inscribed due to a linguistic difference, wherein the speech recognition executor acquires the text information with reference to the stored exceptional phonetic symbol information.

If the speech command is a sentence, the speech recognition executor may recognize the sentence, analyze the recognition result, and acquire the text information based on the analysis result and the phonetic symbol.

The speech recognition executor may remove at least one of a space and a special symbol from the phonetic symbol that is generated as the recognition result, and then acquire the text information having the coincident phonetic symbol.

The speech recognition executor may attempt to perform an operation related to the speech command as the result of recognizing the acquired speech command, and acquire the text information which has a phonetic symbol that is the same as or similar to a phonetic symbol of the recognition result if the operation is unable to be performed as the result of attempt.

According to another aspect of the present disclosure, a method for driving an image display apparatus includes acquiring a speech command created by a user; acquiring text information which has a phonetic symbol that is the same as or similar to a phonetic symbol of a text-based recognition result corresponding to the acquired speech command and is expressed in a form that is different from a form of the text-based recognition result; and performing an operation corresponding to the acquired text information.

The method for driving an image display apparatus may further include storing a command set of a plurality of commands and phonetic symbols of the commands, wherein the acquiring the text information acquires the command stored in the storage as the text information.

The method for driving an image display apparatus may further include displaying content; and a storing configured to store content-related words displayed on the display as commands and matching and storing the phonetic symbols with the stored commands, respectively, wherein the command that is non-fixedly stored in the storage is acquired as the text information.

The method for driving an image display apparatus may further include storing a command set of commands and phonetic symbols of the commands in a first storage; and storing content-related words displayed on a display screen in a second storage as the commands and matching and storing the phonetic symbols with the stored commands, respectively, wherein the acquiring the text information acquires the text information by replacing the recognition result using a pronunciation dictionary if there is no command that matches the phonetic symbol of the recognition result in at least one of the first storage and the second storage.

The method for driving an image display apparatus may further include storing exceptional phonetic symbol information which has the same pronunciation, but has a phonetic symbol that is differently inscribed due to a linguistic difference, wherein the acquiring the text information acquires the text information with reference to the stored exceptional phonetic symbol information.

If the speech command is a sentence, the acquiring the text information may recognize the sentence, analyze the recognition result, and acquire the text information based on the analysis result and the phonetic symbol.

The acquiring the text information may remove at least one of a space and a special symbol from the phonetic symbol that is generated as the recognition result, and then acquire the text information having the coincident phonetic symbol.

The acquiring the text information may attempt to perform an operation related to the speech command as the result of recognizing the acquired speech command, and acquire the text information which has a phonetic symbol that is the same as or similar to a phonetic symbol of the recognition result if the operation is unable to be performed as the result of attempt.

According to still another aspect of the present disclosure, a computer readable recording medium may perform acquiring a speech command created by a user; acquiring text information which has a phonetic symbol that is the same as or similar to a phonetic symbol of a text-based recognition result corresponding to the acquired speech command and is expressed in a form that is different from a form of the text-based recognition result; and performing an operation corresponding to the acquired text information.

The acquiring the text information may acquire the text information with reference to stored exceptional phonetic symbol information which has the same pronunciation, but has a phonetic symbol that is differently inscribed due to a linguistic difference.

If the speech command is a sentence, the acquiring the text information may recognize the sentence, analyze the recognition result, and acquire the text information based on the analysis result and the phonetic symbol.

The acquiring the text information may remove at least one of a space and a special symbol from the phonetic symbol that is generated as the recognition result, and then acquire the text information having the coincident phonetic symbol.

According to another aspect of the present disclosure, a method of controlling an apparatus may include acquiring a speech command for controlling the apparatus, attempting to perform an operation of the apparatus related to the acquired speech command based on a recognition result of the acquired speech command, generating, using a hardware-based processor, a phonetic symbol of the recognition result when the attempting to perform the operation of the apparatus based on the recognition result is unsuccessful, determining a phonetic symbol that is most similar to the generated phonetic symbol from a stored command set comprised of a plurality of phonetic symbols that are each stored with a corresponding apparatus control command, and performing an operation of controlling the apparatus using an apparatus control command that corresponds to the determined phonetic symbol.

According to another aspect of the present disclosure, a method of controlling an apparatus may include receiving a speech command for controlling the apparatus, generating, using a hardware-based processor, a text-based recognition result, in a first language, from the received speech command, converting the generated text-based recognition result in the first language to text information in a second language that is composed of similar phonetic symbols as the generated text-based recognition result, and performing an operation of the apparatus corresponding to the received input speech command based on the converted text information in the second language.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Hereinafter, embodiments of the present disclosure will be described in detail with reference to the accompanying drawings.

Figure 1:
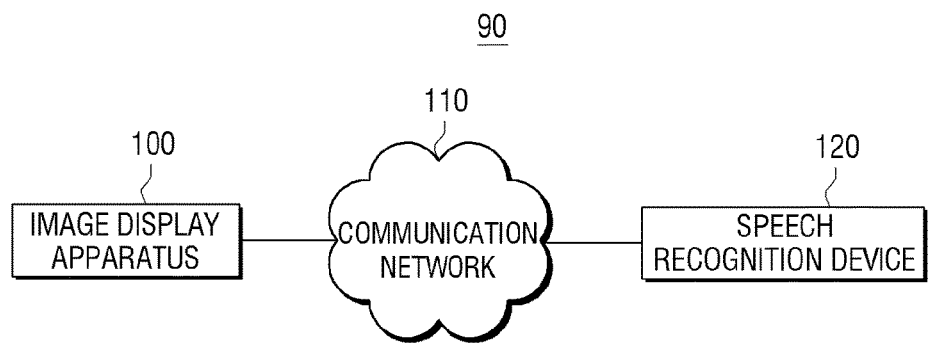
FIG. 1 is a diagram illustrating a speech recognition system according to an embodiment of the present disclosure.

FIG. 1 is a diagram illustrating a speech recognition system according to an embodiment of the present disclosure.

As illustrated in FIG. 1, a speech recognition system 90 according to an embodiment of the present disclosure includes a part or the whole of an image display apparatus 100, a communication network 110, and a speech recognition device 120.

Here, the term "includes a part or the whole" means that a part of constituent elements, such as the communication network 110, may be omitted in the case where the image display apparatus 100 and the speech recognition device 120 perform direct communication with each other. For sufficient understanding of the present disclosure, explanation will be made on the assumption that the speech recognition system 90 includes all of the above-described constituent elements.

The image display apparatus 100 includes an image displayable device, such as a portable phone, a notebook computer, a desktop computer, a tablet PC, a PDP, an MP3, or a TV. Here, the image display apparatus 100 may be one of cloud terminals. In other words, in the case where a user executes a specific function of the image display apparatus 100 or creates a word or sentence-type speech command to perform an operation, the image display apparatus 100 may provide a speech signal that is acquired from the speech command to the speech recognition device 120. Thereafter, the image display apparatus 100 receives the recognition result from the speech recognition device 120 and performs a specific function or operation based on the received recognition result. Here, execution of the specific function or operation means to execute an application displayed on a screen or to perform an operation, such as channel switching or volume control.

For example, if a user speaks a word, the image display apparatus 100 may perform an operation to execute a specific application. For example, if a user speaks a word "Youtub*", the corresponding application may be executed. Further, in the case of speaking a sport player's name, an operation, such as a current game or search for the corresponding player, may be executed. In order to perform a function or operation with respect to the specific word spoken by the user, a user or system designer's setting operation may be performed in advance.

Further, in the case of speaking a word, it may be actually possible to execute an inner fixed speech engine without depending on the external speech recognition device 120. In other words, the image display apparatus may internally create the recognition result, determine whether the created recognition result exists in a pre-stored command set, and if the recognition result exists in the pre-stored command set as the result of determination, perform an operation desired by the user, that is, operation related to a user's speech command. However, in the present situations in which content, such as broadcasts, movies, or music, is continuously produced, such operations may be quite limited.

Accordingly, the image display apparatus 100 may overcome the limits that depend on a fixed speech engine using an internal fixed speech engine and an external resource, that is, a spontaneous speech engine of the speech recognition device 120. However, in the case of using the spontaneous speech engine, the function may not be simply executed with a text due to a difference between recognizable commands, types of spontaneous speech recognition results, or languages. For example, although the image display apparatus 100 is set to execute the corresponding application according to the spoken command " 유투*" in Korean, it may not operate with respect to "Youtub*" having the same pronunciation and the same semantic.

More specifically, in accordance with three situations and user's speech types or intentions, 6 scenarios may be applied.

The first situation corresponds to a case where a command set is defined and a method for fixing the command set is used to execute a specific function that enables only words included in the command set to be recognized in a device that is unable to use the spontaneous speech engine due to the performance or the environment of the device although the speech recognition is performed using the spontaneous speech engine. In the case of the device that supports both the spontaneous engine and the fixed speech recognition, different engines may be used in accordance with the environment of the device. If both the spontaneous speech engine and the fixed speech engine are used in a device having a specific environment, the result that is received from the spontaneous speech engine may differ from the words in the command set of the fixed speech engine in type and language (e.g., in the case where the spontaneous speech recognition result is "Face boo*" whereas the fixed speech command set is " 페이스*", a function executor that simply performs the function with the text may not perform a proper operation.

In the case where the speech recognition executor, that is, speech recognition engine, creates only a word other than an interactive speech in order to execute the function that is in the command set, the recognition result is received, but the device is unable to perform any operation using the speech recognition result, the image display apparatus 100 may generate phonetic symbols of the words existing in the command set and the word received as the spontaneous speech recognition result. The image display apparatus generates phonetic symbols, compares the generated phonetic symbols with the phonetic symbols of the words existing in the command set after removing spaces and special symbols from the phonetic symbols, and then, if there is a word having the same phonetic symbol, transmits the corresponding word to the function operator. In comparing the recognition result with the phonetic symbols of the command set, exceptional terms that may be caused by the linguistic difference may be processed using an exceptional phonetic symbol DB (or storage) that stores similar phoneme alphabet.

Further, according to the image display apparatus 100 according to an embodiment of the present disclosure, although the speech recognition engine has received the interactive speech recognition result intended to execute the function existing in the command set, but the device is unable to perform any operation using the speech recognition result, the image display apparatus 100 extracts an objective from the received interactive sentence, and generates phonetic symbols of the words existing in the command set and the word that is determined as the objective of the interactive sentence. The image display apparatus 100 removes the space and the special symbol existing in the phonetic symbol after generating the phonetic symbol, compares the generated phonetic symbol with the phonetic symbols of the words existing in the command set, and if there is a word having the same phonetic symbol, replaces the corresponding word existing in the command set by the objective of the interactive sentence to transmit the same to the function operator. In comparing the objective of the recognition result with the phonetic symbols of the command set, exceptional terms that may be caused by the linguistic difference may be processed using the exceptional phonetic symbol DB as described above.

The second situation may occur when content or the function is displayed on the device. In other words, the words being displayed may be non-fixedly changed, and in this case, the words being displayed are stored in the non-fixed command set. However, in the same manner as the first situation, the words existing in the non-fixed command set may differ from the spontaneous speech recognition result in form and language, and thus the function executor that performs the function simply with the text may not perform a proper operation.

For this, in the case where a user speaks only a word, such as the title of content which is displayed on the display and is stored in the non-fixed command set using the spontaneous speech recognition engine, other than the interactive speech, the image display apparatus 100 generate the phonetic symbols of the words existing in the command set and the word received as the spontaneous speech recognition result. After generating the phonetic symbols, the image display apparatus removes spaces and special symbols from the phonetic symbols, and compares the generated phonetic symbols with the phonetic symbols of the words existing in the non-fixed command set. If there is a word having the same phonetic symbol, the image display apparatus 100 transmits the corresponding word existing in the non-fixed command set to the function operator to perform the operation. In comparing the recognition result with the phonetic symbols of the command set, exceptional terms that may be caused by the linguistic difference may be processed using an exceptional phonetic symbol DB that stores similar phoneme alphabet.

Further, although the speech recognition engine has received the interactive speech recognition result for operating on the content or the function being displayed on the device, but the device is unable to perform any operation using the speech recognition result, the image display apparatus 100 extracts an objective from the received interactive sentence, and generates phonetic symbols of the words existing in the command set and the word that is determined as the objective of the interactive sentence. After generating the phonetic symbols, the image display apparatus 100 removes the space and the special symbol existing in the phonetic symbol, and compares the generated phonetic symbol with the phonetic symbols of the words existing in the command set. If there is a word having the same phonetic symbol, the image display apparatus 100 replaces the corresponding word existing in the command set by the objective of the interactive sentence to transmit the same to the function operator. In comparing the objective of the recognition result with the phonetic symbols of the non-fixed command set, exceptional terms that may be caused by the linguistic difference may be processed using the exceptional phonetic symbol DB.

The third situation may occur when words which are not being displayed and are not included even in the command set are spoken. This situation normally occurs when a speech for searching for content is produced, and in the same manner as the first situation, the actual names or titles of the content to be searched for or the functions to be operated differ from the spontaneous speech recognition result in form and language, and thus the function executor that performs the function simply with the text may not perform a proper operation.

For this, although a user speaks only words which are not displayed on the device and do not exist even in the non-fixed command set, other than the interactive speech, the image display apparatus 100 may have no search report or may be unable to operate. In this case, since there is not a command set that is the subject of comparison, the image display apparatus 100 transmits the recognition result to the function operator in a state where the language or the form of the recognition result is changed using a pronunciation dictionary. The result in native language is replaced by the result in foreign language (generally, English), and the result in foreign language is replaced by the result in native language. For example, if the spontaneous speech result is "Iron ma*", and the content name is " 아이언*", the phonetic symbol of "Iron ma*" is analyzed and is replaced by " 아이언*" unless " 아이언*" is searched for. In this case, if the phonetic symbols are automatically generated, there may be a difference between the phonetic symbols due to the characteristics of the different languages even if they have the same pronunciation. In this case, the recognition result is processed using a word phonetic symbol dictionary DB (or storage) in which phonetic symbols of words are stored.

Further, there is a scenario when words, which do not exist in the command set or in the non-fixed command set since they are not displayed on the device, are spoken with an interactive sentence, but there is not the search result or the image display apparatus is unable to operate. In this case, since there is not a command set that is the subject of comparison, the image display apparatus extracts an objective from the recognition result, and transmits the recognition result to the function operator in a state where the language or the form of the recognition result is changed using a pronunciation dictionary of the extracted objective. The result in native language is replaced by the result in foreign language, and the result in foreign language is replaced by the result in native language. In this case, if the phonetic symbols are automatically generated, there may be a difference between the phonetic symbols due to the characteristics of the different languages even if they have the same pronunciation. In this case, the recognition result may be processed using a word phonetic symbol dictionary DB in which phonetic symbols of words are stored.

As described above, the image display apparatus 100 according to an embodiment of the present disclosure may increase the execution rate of the speech recognition through comparison of phonetic symbols of speech information, for example, a text (in this case, the speech information corresponds to text information). Representatively, phonetic symbols of " 유투*" and " 페이스*" are exemplified as follows.

| | | |
|---|---|---|
| 유투* | - ju.t{u.bu- | [Ex. 1] |
| Youtub* | - ja.u.t{u.bu- | |
| 페이스* | - p{e.i.s'u-_puk | [Ex. 2] |
| Face boo* | - p{e.i.s'u-_puk | |

The phonetic symbols as described above are used for embedded speech recognition, and the pronunciation of the text to be recognized is generated using the phoneme alphabet. Since they are generated on the basis of the pronunciation, the phonetic symbols almost coincide with each other in the case where they have the same pronunciation even if they are in different languages.

However, since they are in different languages, their phonetic symbols do not always coincide with each other. That is, among Korean phoneme alphabets, due to the difference between Korean and foreign language, such as English, almost similar pronunciations may be produced with respect to the text to be recognized. For example, "p" in Korean and "p'" in foreign language, such as English, may be produced. In this case, in order to process "p" and "p'" as the same alphabet, the exceptional phonetic symbol DB, in which "p" and "p'" are stored as similar phoneme alphabets, is used. Further, the exceptional phonetic symbol DB is used to convert the text in native language into the text in foreign language, and vice versa. Due to the difference between the native language and English, there may be an error in the phonetic symbols. For example, "Face boo*" and " 페이스*" have the coincident phonetic symbol, but there exists somewhat a difference between the phonetic symbols of "Iron ma*", and " 아이언*". In an exceptional case where different phonetic symbols are generated with respective to such a specific word, a word phonetic symbol dictionary DB, in which exceptional phonetic symbols are stored by words, is used to correctly match the differently generated phonetic symbols with each other.

The communication network 110 includes both wired and wireless communication networks. Here, the wired communication network may include the Internet, such as a cable network or a PSTN (Public Switched Telephone Network), and the wireless communication network may include CDMA, WCDMA, GSM, EPC (Evolved Packet Core), LTE (Long Term Evolution), and Wibro. However, the communication network 110 according to an embodiment of the present disclosure is not limited thereto, but may be used, for example, in a cloud computing network under cloud computing environment as a connection network of the next-generation mobile communication system to be implemented in future. For example, if the communication network 110 is a wired communication network, an access point in the communication network 110 can connect to an exchange of a telephone office, whereas in the case of a wireless communication network, the access point may connect to a SGSN or GGSN (Gateway GPRS Support Node) operated by a communication company to process data, or may connect to various repeaters, such as BTS (Base Transceiver Station), NodeB, and e-NodeB, to process data.

The communication network 110 may include an access point. The access point includes a small base station, such as a femto or pico base station, which is mainly installed in a building. Here, the femto or pico base station may be classified depending on how many image display devices 100 can be maximally connected thereto according to the classification of the small base station. The access point includes a near field communication module for performing near field communication, such as ZigBee or Wi-Fi, with the image display apparatus 100. The access point may use TCP/IP or RTSP (Real-Time Streaming Protocol) to perform wireless communication. Here, the near field communication may be performed in various standards, such as RF (Radio Frequency) and UWB (Ultra Wideband) communication, such as Bluetooth, ZigBee, infrared rays (IrDA), UHF (Ultra High Frequency), and VHF (Very High Frequency), in addition to Wi-Fi. Accordingly, the access point may extract the position of a data packet, designate the best communication path for the extracted position, and transfer the data packet to a next device, for example, the image display apparatus 100 along the designated communication path. The access point can share several lines in a general network environment, and may include, for example, a router, a repeater, and a relay.

The speech recognition device 120 may operate as a kind of a cloud server, and may be called an external device or a recognition result providing device. The speech recognition device 120 may include a spontaneous speech engine, and recognize a speech signal that is provided from the image display apparatus 100 through execution of the spontaneous speech engine to provide the recognition result to the image display apparatus 100 in the form of a text. Here, the spontaneous speech engine is a high performance engine in comparison to a fixed speech engine of the image display apparatus 100, and can provide the more accurate recognition result.

Of course, the speech recognition device 120 according to an embodiment of the present disclosure is not limited to a cloud server. For example, in the case where the communication network 110 is omitted and the image display device 100 performs direct communication with the speech recognition device 120, the speech recognition device 120 may be an external device, i.e., an access point, or a peripheral device, such as a desktop computer. In other words, any type of a device can be used so far as it can provide the recognition result for the speech signal that is provided by the image display apparatus 100. Considering this, the speech recognition device 120 may be a recognition result providing device.

According to an embodiment of the present disclosure, in comparison to the related art, the user's intention can be reflected more accurately in controlling the apparatus or executing the operation. Further, in an embodiment of the present disclosure, the semantics of the texts are used although the correct result is derived through analysis of the speech recognition result, and thus unlike the related art in which inconsistency of the texts occurs, the speech recognition result is processed through matching of simple texts other than the semantics thereof to heighten the execution rate of the devices.

Figure 2:
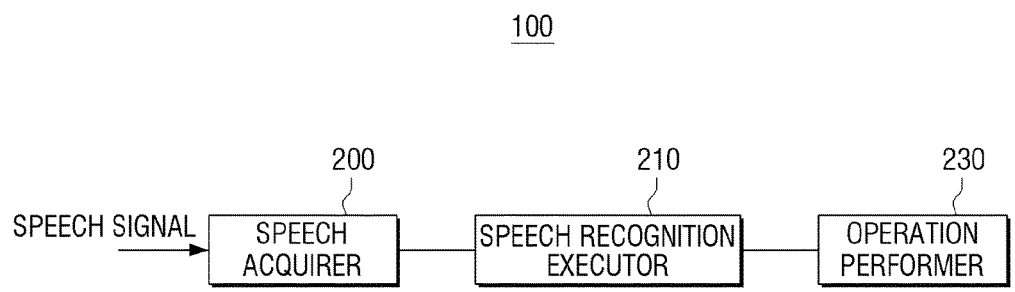
FIG. 2 is a block diagram illustrating one configuration of an image display apparatus illustrated in FIG. 1.

FIG. 2 is a block diagram illustrating one configuration of an image display apparatus illustrated in FIG. 1.

Referring to FIG. 2 together with FIG. 1, the image display apparatus 100 according to an embodiment of the present disclosure includes a speech acquirer 200, a speech recognition executor 210, and an operation performer 220.

The speech acquirer 200 may include a microphone. The speech acquirer 200 may acquire a speech created by a user through the microphone and may provide the acquired speech to the speech recognition executor 210. That is, the speech acquirer 200 generates and provides a speech signal of the acquired speech.

The speech recognition executor 210 operates the operation performer 220 based on the recognition result of the acquired speech. If the operation performer 220 does not operate with the corresponding recognition result, the speech recognition executor 210 may generate a phonetic symbol for the recognition result, and acquire speech information based on the generated phonetic symbol to operate the operation performer 220. In order to generate the recognition result, the speech recognition executor 210 may directly perform the speech recognition operation, that is, without assistance from an external device. Alternatively, the speech recognition executor 210 may transmit the acquired speech signal to the external device, such as the speech recognition device 120 of FIG. 1, receive the recognition result for the transmitted speech signal, and operate the operation performer 220 based on the received recognition result.

If the operation performer 220 does not operate based on the corresponding recognition result, the speech recognition executor 210 may generate the phonetic symbol for the corresponding recognition result, and acquire the speech information that coincides with the generated phonetic symbol. For example, the operation performer 220 searches for the speech information having the coincident phonetic symbol from a pre-stored command set, and operates, based on this, the operation performer 220 with the corresponding speech information. Although the contents related to this have been sufficiently described, they will be hereinafter described in more detail.

Although not illustrated in the drawing, the speech recognition executor 210 may further include constituent elements for operation with, for example, the external speech recognition device 120. For example, the speech recognition executor 210 may include a communication interface configured to receive the recognition result for the transmitted speech signal, and a controller configured to operate the operation performer 220 using the recognition result received from the communication interface.

In addition, the speech recognition executor 210 may include an image processor configured to perform the original function thereof. In other words, the speech recognition executor 210 may perform various operations, such as receiving and separating a video/audio signal received from an external broadcasting device, decoding the separated video and audio signals, and scaling the decoded signals. For this, the speech recognition executor 210 may include a tuner, a signal separator, a decoder, and a scaler.

The operation performer 220 includes various functional blocks, such as an application executor configured to execute a specific application in accordance with a request or a control of the speech recognition executor 210, a channel switch, more particularly, a tuner, configured to switch channels based on a speech command, and a volume controller configured to control the volume. The operation performer 220 may further include a brightness controller configured to control the brightness. Further, the operation performer 220 may be a controller configured to control a certain operation in accordance with a request from the speech recognition executor 210.

Figure 3:
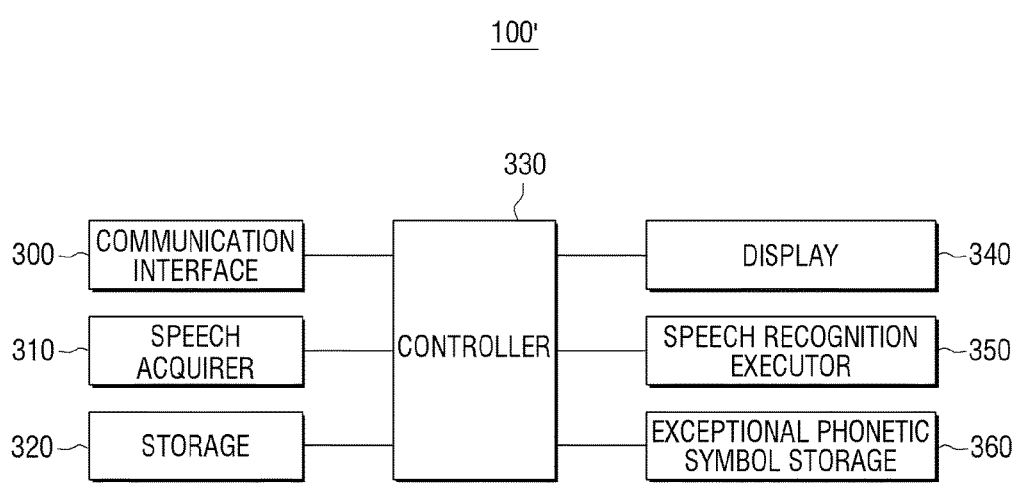
FIG. 3 is a block diagram exemplarily illustrating another configuration of an image display apparatus illustrated in FIG. 1.

FIG. 3 is a block diagram exemplarily illustrating another structure of an image display apparatus illustrated in FIG. 1.

An image display apparatus 100' illustrated in FIG. 3 includes a part or the whole of a communication interface 300, a speech acquirer 310, a storage 320, a controller 330, a display 340, a speech recognition executor 350, and an exceptional phonetic symbol storage 360, and may further include a pronunciation dictionary executor.

Here, the term "includes a part or the whole" means that a part of constituent elements, such as the exceptional phonetic symbol storage 360, is omitted, the exceptional phonetic symbol storage 360 is integrated into another constituent element, such as the storage 320, or the speech recognition executor 350 is integrated into the controller 330. For sufficient understanding of the present disclosure, explanation will be made on the assumption that the image display apparatus 100' includes the whole constituent elements.

Even being aside from the portion related to the image processing and in relation to the speech recognition, the communication interface 300 transmits a speech signal that is acquired through the speech acquirer 310 to the speech recognition device 120 of FIG. 1 under the control of the controller 330. Further, the communication interface 300 may receive the recognition result that is provided from the speech recognition device 120 and transfer the received recognition result to the controller 330.

The speech acquirer 310 may be a speech receiver that receives the speech, and may include a microphone for acquiring the speech. The speech acquirer 310 acquires a command in the form of a word or a sentence that is spoken by the user. The speech signal for the acquired speech may be transferred to the communication interface 300 under the control of the controller 330. Through this process, the speech acquirer 310 may generate the speech signal for the acquired speech.

The storage 320 may store various pieces of information processed in the image display apparatus 100'. First, in order to perform the speech recognition operation according to an embodiment of the present disclosure, the storage 320 may store speech information of various speech commands and phonetic symbols that match the speech information. Such speech information and phonetic symbols may be stored in the form of a lookup table. In other words, the storage 320 may form a command set of the commands as the speech information, and match the phonetic symbols with the command set to store the phonetic symbols. Even if the phonetic symbols are not matched to be stored, according to an embodiment of the present disclosure, it would be possible without limitation to directly generate the phonetic symbol using the pronunciation dictionary through execution of a pronunciation dictionary algorithm in the speech recognition executor 350 or operation of a separate pronunciation dictionary executor.

Although the command set and the matched phonetic symbols stored in the storage 320 may be pre-stored, the command generated and provided by the speech recognition executor 350 and the matched phonetic symbol may be periodically received and stored. For example, in the case where certain content is displayed on the display 340, the speech recognition executor 350 generates a word related to the content displayed on the screen as a command, and a phonetic symbol for the generated command, and the storage 320 can store the corresponding information therein.

The controller 330 controls the whole operation of the communication interface 300, the speech acquirer 310, the storage 320, the display 340, the speech recognition executor 350, and the exceptional phonetic symbol storage 360. For example, the controller 330 may transfer the speech signal acquired from the speech acquirer 310 to the communication interface 300, and provide the recognition result for the speech signal received through the communication interface 300 to the speech recognition executor 350. Further, the controller 330 may provide information related to the content that is displayed on the display 340 to the speech recognition executor 350. Through this process, the controller 330 may store the command and the phonetic symbol for the command that are generated by the speech recognition executor 350 in the storage 320. The controller may be implemented as a microprocessor, a computer processor, or any other hardware-based processor and the controller may be distributed or included within a single device such as the image display apparatus 100.

The display 340 may be one of the operation performer 220 as illustrated in FIG. 2. For example, if a user commands "Increase the resolution", the controller 330 may show a screen on which the resolution is adjusted on the display 340 on the basis of the phonetic symbol based on, for example, the command set stored in the storage 320 according to the operation of the speech recognition executor 350. Further, the display 340 may show various types of content. The content related information that is displayed on the display 340 according to a user's predetermined operation may be provided to the display 340 under the control of the controller 330.

In the case where the speech recognition executor 350 is unable to operate in association with the external speech recognition device 120 as illustrated in FIG. 1, it may generate the recognition result by operating an internal engine. For example, the speech recognition executor 350 may generate the recognition result, for example, in the form of a text. It may be determined whether the recognition result generated as described above is in the command set of the storage 320. If the recognition result does not exist in the command set as the result of the determination, the speech recognition executor 340 may provide the recognition result by changing the type of the language thereof using the internal pronunciation dictionary algorithm or a separate pronunciation dictionary DB (or the storage or the pronunciation dictionary executor). In accordance with the changed speech information as described above, the controller 330 may control the display 340 or operate to perform a specific operation.

If it is possible to operate in association with the external speech recognition device 120, the speech recognition executor 350 attempts to perform an operation related to the command based on the recognition result that is provided from an outside, and if performing of the corresponding operation is not possible, it may perform various operations, such as generating of the phonetic symbol for the recognition result. Further, the speech recognition executor 350 may provide the generated phonetic symbol to the controller 330 and enable the controller 330 to search for speech information having the coincident phonetic symbol from the command set stored in the storage 320 based on the generated phonetic symbol and to perform an operation related to the spoken command. Further, with respect to the exceptional phonetic symbols that are generated due to the linguistic difference among the phonetic symbols, phonetic symbol information that is provided from the exceptional phonetic symbol storage 360 could be referred to.

The exceptional phonetic symbol storage 360 matches and stores the phonetic symbols which have the same pronunciation, but are differently inscribed due to a linguistic problem. If speech information which has partially different phonetic symbols is searched for as the result of searching for the speech information stored in the storage 320 based on the phonetic symbol generated by the speech recognition executor 350, it is additionally determined whether the corresponding partial phonetic symbol coincides with the information stored in the exceptional phonetic symbol storage 360 to finally search for the speech information. Accordingly, in an embodiment of the present disclosure, even if the phonetic symbols do not accurately coincide with each other, the search range may be extended up to the similar range.

Based on the above-described contents, the image display apparatus 100' according to the embodiment of the present disclosure can be variously modified without limit. As described above, the speech recognition executor 350 may be integrated into the controller 330 to operate in the form of an algorithm, and further, even the storage 320 and the exceptional phonetic symbol storage 360 may be further included in the controller 330 to be implemented in the form of an algorithm. Although it is preferable that even the pronunciation dictionary executor is implemented as a part of an algorithm provided in the speech recognition executor 350, it may also be possible that the pronunciation dictionary executor is implemented to be integrated into the controller 300.

Further, the controller 330 may include the tuner, the signal separator, the decoder, and the scaler as described above in order to perform the general image processing in addition to the speech recognition operation. Since this feature is not related to the subject of the present disclosure, further explanation thereof will be omitted.

Figure 4:
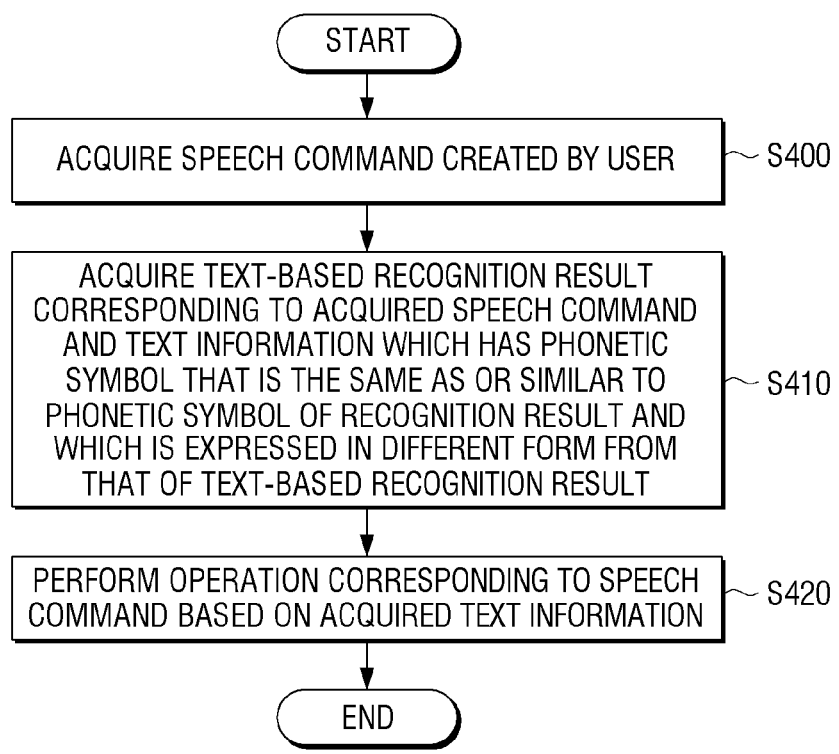
FIG. 4 is a flowchart illustrating a process of driving an image display apparatus according to an embodiment of the present disclosure.

FIG. 4 is a flowchart illustrating a process of driving an image display apparatus according to an embodiment of the present disclosure. Hereinafter, it is exemplified that speech information is text information.

For convenience in explanation, referring to FIG. 4 together with FIG. 1, an image display apparatus 100 according to an embodiment of the present disclosure acquires a speech command created by a user (S400). In an embodiment, it may be preferable that the speech command is in the form of a word.

Then, the image display apparatus 100 acquires text-based recognition result corresponding to the acquired speech command and text information which has a phonetic symbol that is the same as or similar to the phonetic symbol of the text-based recognition result and is expressed in a form that is different from the form of the text-based recognition result (S410).

More specifically, for example, the image display apparatus 100 determines whether it is possible to perform an operation by attempting to perform an operation related to the speech command as the acquired recognition result of the speech command. In an embodiment of the present disclosure, in the case of attempting to perform an operation based on semantics other than text expression (or description) itself, the image display apparatus 100 may be unable to perform the operation. For example, " 페이스*" and "Face boo*" have the same semantic, but have different text expressions. Accordingly, since " 페이스*" is set in the command set to perform the operation, the image display apparatus 100 is unable to perform a desired operation in the case where "Face boo*" is provided as the recognition result.

The image display apparatus 100 acquires text information having the phonetic symbol that is the same as or similar to the phonetic symbol of the recognition result, but in an embodiment, may be in a different language. For this, the image display apparatus 100 may generate phonetic symbols of commands of the command set stored to match the phonetic symbols, compare the phonetic symbols with each other, and acquire one command according to the result of the comparison as the speech information. In other words, through comparison of the phonetic symbols in the command set, the image display apparatus 100 determines " 페이스*" to replace "Face boo*" as the recognition result.

Then, the image display apparatus 100 may perform the operation related to the speech command based on the acquired text information (S420).

Of course, the image display apparatus 100 may search for the command set in order to find the text information that matches the phonetic symbol of the recognition result. However, there is not a searchable command set, the image display apparatus 100 may replace the recognition result by a text through changing of the language or form using a pronunciation dictionary and then attempt to perform a desired operation with the replaced text.

In this process, inconsistency of the phonetic symbols may exceptionally occur between the phonetic symbol of the recognition result and the phonetic symbol that matches the commands of the command set due to the linguistic difference, and thus the image display apparatus 100 may find the text information further referring to the exceptional phonetic symbols.

Further, the image display apparatus 100 may acquire a speech command that is created as a sentence other than a word. In this case, the image display apparatus 100 may analyze the recognition result of the speech command and determine instructions of the corresponding command as the analysis result. For example, if a command "Increase volume" is acquired, the image display apparatus 100 may acquire "volume" as an objective and acquire "increase" as a verb through analysis of the recognition result. Based on this, the image display apparatus 100 may attempt to perform the operation, and if the operation is unable to be performed, may reattempt to perform the operation by finding the text information based on the phonetic symbols for the objective "volume".

Further, since it is also possible to use the phonetic symbol itself as the speech information of the text information without limit, embodiments of the present disclosure are not specially limited to the above-described contents.

Referring to FIGS. 5 to 10, various situations in which a word or a sentence is created as a speech command will be described.

Figure 5:
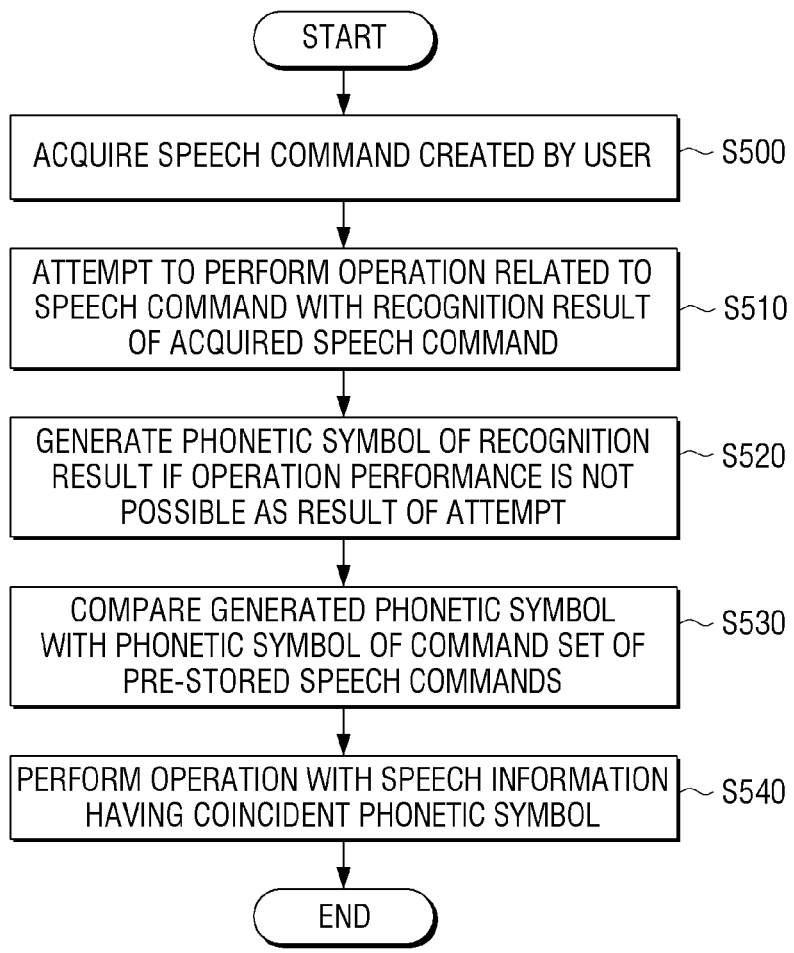
FIG. 5 is a flowchart illustrating a process of driving an image display apparatus that performs an operation with respect to a word-type speech command using a phonetic symbol in a command set.

FIG. 5 is a flowchart illustrating a process of driving an image display apparatus that performs an operation with respect to a word-type speech command using a phonetic symbol in a command set.

For convenience in explanation, referring to FIG. 5 together with FIG. 1, an image display apparatus 100 according to an embodiment of the present disclosure acquires a speech command in the form of a word created by a user (S500).

Then, the image display apparatus 100 attempts to perform an operation related to the speech command based on the recognition result of the acquired speech command (S510). Here, it is preferable that the recognition result is provided using a spontaneous speech engine provided in an external speech recognition device 120.

If operation performance is not possible as the result of attempting to perform the operation with the recognition result based on, for example, the spontaneous speech engine, the image display apparatus 100 generates the phonetic symbol of the recognition result (S520).

Then, the image display apparatus 100 compares the generated phonetic symbol with the phonetic symbols of the command set for the speech commands pre-stored in the image display apparatus 100 (S530). As the result of the comparison, the image display apparatus 100 may use the command of the phonetic symbol that coincides with the corresponding phonetic symbol as the speech information.

If there are no phonetic symbols for the pre-stored commands, the image display apparatus 100 would be able to generate the phonetic symbols for the commands in the command set together (S520).

Further, in the case where a portion corresponds to the exceptional phonetic symbol, the image display device 100 may search for accurate speech information with reference to the exceptional phonetic symbols which are stored in the same storage or in a separate storage.

Then, the image display apparatus 100 may perform a desired operation by reattempting to perform the operation with the speech information having the coincident phonetic symbol (S540).

Figure 6:
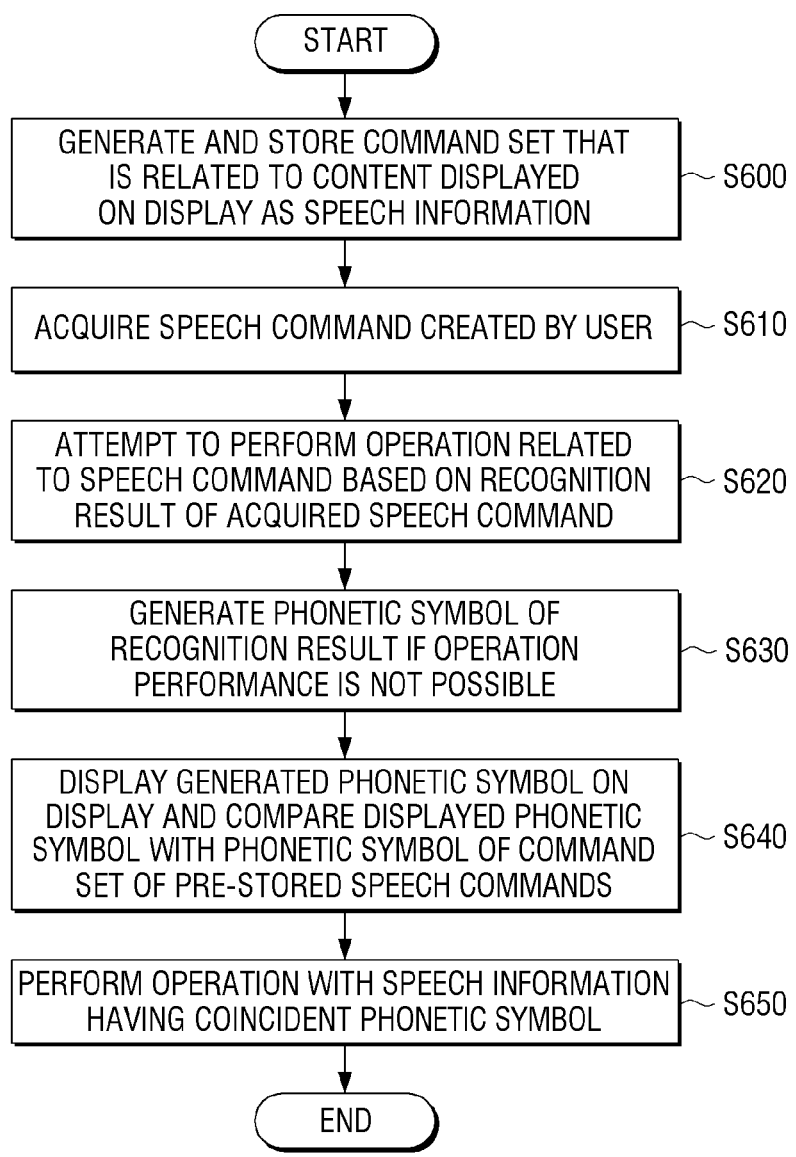
FIG. 6 is a flowchart illustrating a process of driving an image display apparatus that performs an operation with respect to a word-type speech command using a phonetic symbol in a non-fixed command set.

FIG. 6 is a flowchart illustrating a process of driving an image display apparatus that performs an operation with respect to a word-type speech command using a phonetic symbol in a non-fixed command set.

For convenience in explanation, referring to FIG. 6 together with FIG. 1, an image display apparatus 100 according to an embodiment of the present disclosure generates words related to content that is displayed on the display 340 of FIG. 3 as a command set and stores the generated commands (S600). For example, the words that are displayed on the display 340 may be non-fixedly changed, and in this embodiment of the present disclosure, the command set for such words can be non-fixedly generated and stored. For this, the image display apparatus 100 may solely perform the above-described operation, or may perform the above-described operation in association with an external speech recognition device 120.

Then, the image display apparatus 100 acquires a speech command created by a user (S610).

Then, the image display apparatus 100 attempts to perform an operation related to the speech command based on the recognition result of the acquired speech command (S620). Here, the recognition result corresponds to the result that is provided using, for example, a spontaneous speech engine of the speech recognition device 120 that is externally associated with the image display apparatus 100.

Further, if operation performance is not possible, the image display apparatus 100 generates the phonetic symbol of the recognition result (S630). For this, a pronunciation dictionary algorithm may be used.

Then, the image display apparatus 100 compares the generated phonetic symbol with the phonetic symbols of the command set for the speech commands that are non-fixedly changed (S640).

Thereafter, the image display apparatus 100 performs the operation using the corresponding command having the coincident phonetic symbol as the speech information (S650).

Figure 7:
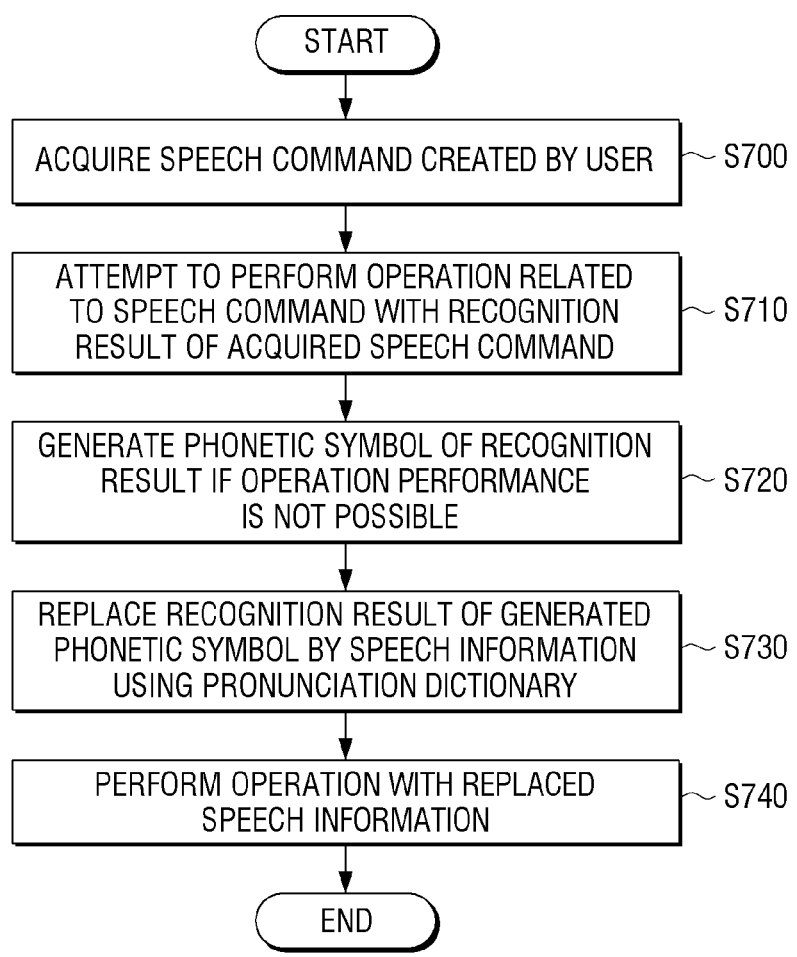
FIG. 7 is a flowchart illustrating a process of driving an image display apparatus that performs an operation with respect to a word-type speech command that does not exist in a command set and a non-fixed command set.

FIG. 7 is a flowchart illustrating a process of driving an image display apparatus that performs an operation with respect to a word-type speech command that does not exist in a command set and a non-fixed command set.

For convenience in explanation, referring to FIG. 7 together with FIG. 1, an image display apparatus 100 according to an embodiment of the present disclosure acquires a speech command created by a user (S700).

Then, the image display apparatus 100 attempts to perform an operation related to the speech command as the recognition result for the acquired speech command (S710).

Then, if operation performance is not possible as the result of attempting, the image display apparatus 100 generates the phonetic symbol of the recognition result (S720).

Then, the image display apparatus 100 compares the generated phonetic symbol with at least one of the command set of FIG. 5 and the non-fixed command set of FIG. 6, and if it is determined that speech information that coincides with the corresponding phonetic symbol does not exist, it may replace the speech information using a pronunciation dictionary (S730). In other words, the speech information may be changed to a text which has the coincident phonetic symbol and the same semantic, but has a different form and language.

Thereafter, the image display apparatus 100 performs the operation with the replaced speech information (S740).

Figure 8:
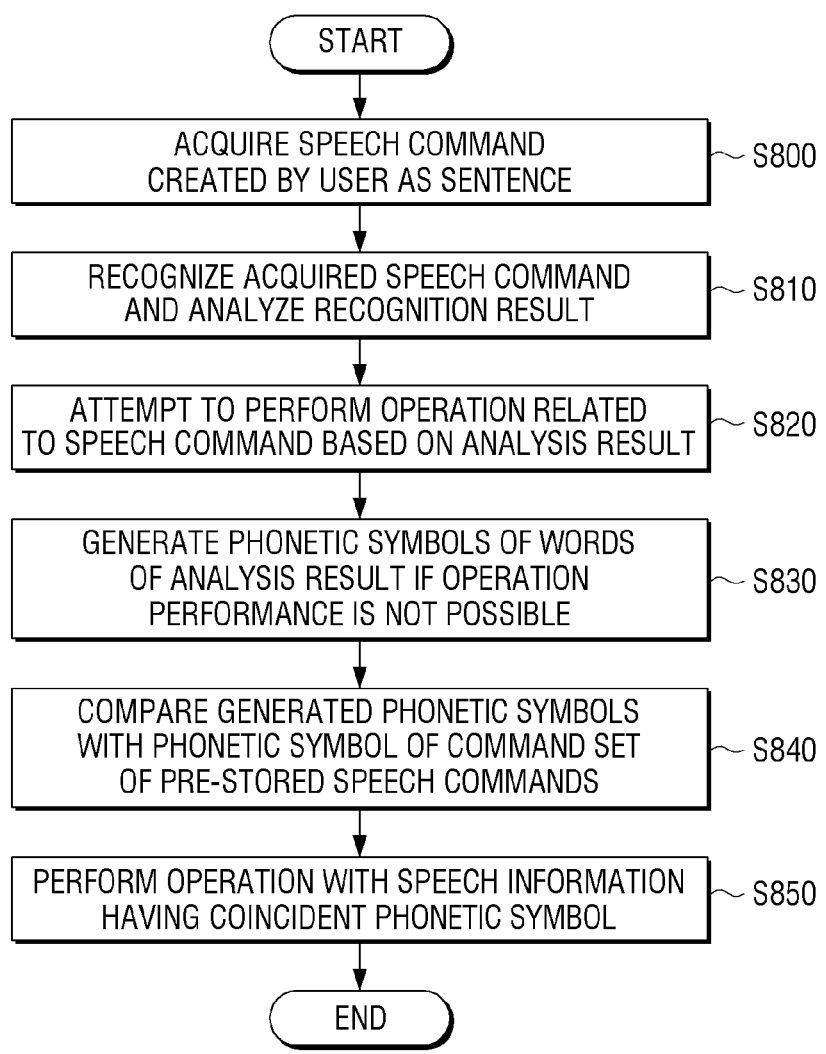
FIG. 8 is a flowchart illustrating a process of driving an image display apparatus that performs an operation with respect to a sentence-type speech command using a phonetic symbol in a command set.

FIG. 8 is a flowchart illustrating a process of driving an image display apparatus that performs an operation with respect to a sentence-type speech command using a phonetic symbol in a command set.

Comparing FIG. 8 with FIG. 5, if a user speaks a command with a sentence, the image display apparatus 100 according to an embodiment of the present disclosure may further require a process for analyzing the command (S810 and S820). In other words, if the word as shown in FIG. 5 is spoken, the image display apparatus 100 can predetermine what operation is to be performed. However, in the case of FIG. 8, since a user has mentioned a detailed operation, the image display apparatus 100 should recognize this. For example, if a user speaks " 아이언*보여줘", the objective " 아이언*" becomes an object, that is, a target, to be controlled, and the verb " 보여줘" becomes the detailed operation.

However, in the case of the objective " 아이언*" as described above, for example, if a spontaneous speech engine is used, this may differ from the command of the image display apparatus 100, and thus it is necessary to find an accurate command using the phonetic symbol.

Except for this point, S800 to S850 in FIG. 8 are not greatly different from S500 to S540 in FIG. 5, and thus may be replaced by the contents thereof.

Figure 9:
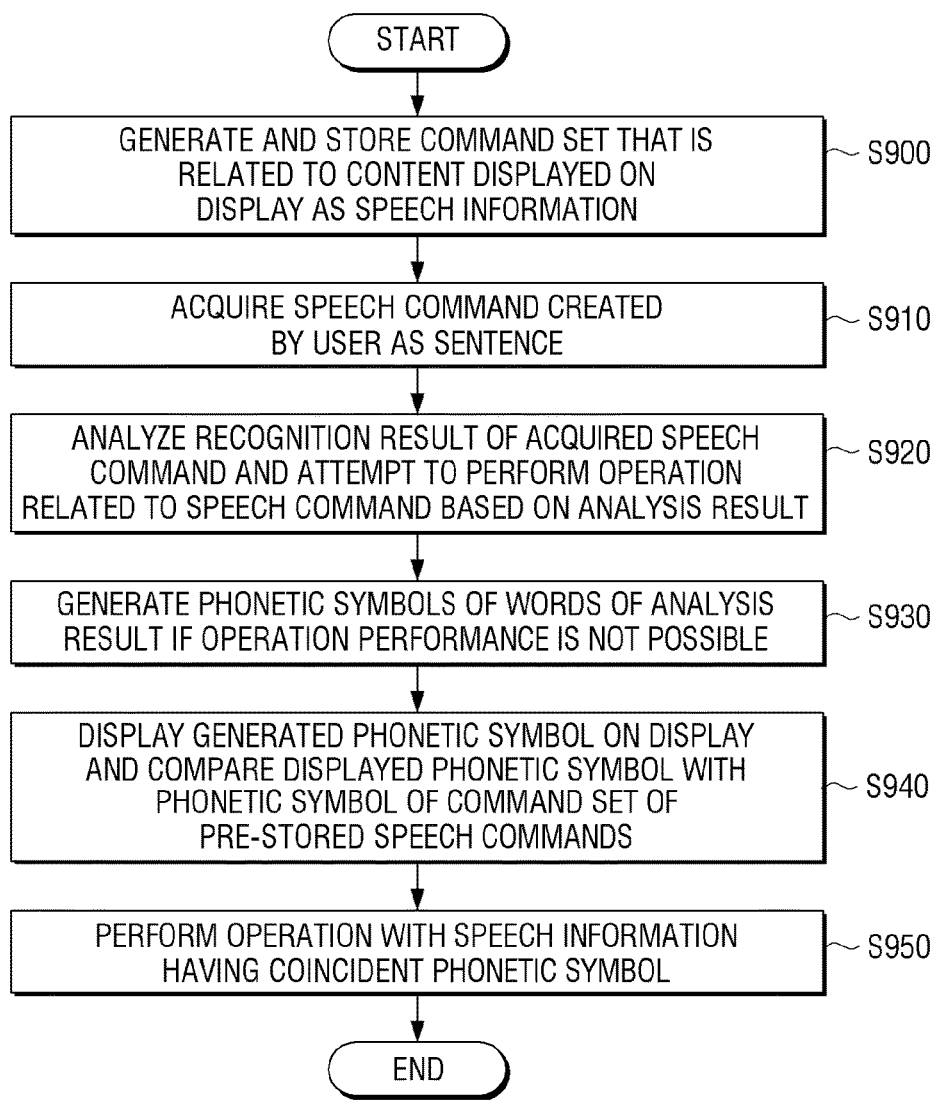
FIG. 9 is a flowchart illustrating a process of driving an image display apparatus that performs an operation with respect to a sentence-type speech command using a phonetic symbol in a non-fixed command set.

FIG. 9 is a flowchart illustrating a process of driving an image display apparatus that performs an operation with respect to a sentence-type speech command using a phonetic symbol in a non-fixed command set.

Comparing FIG. 9 with FIG. 6, an image display apparatus 100 according to an embodiment of the present disclosure is different from the image display apparatus 100 of FIG. 6 on the point that a user speaks a sentence, but is the same as the image display apparatus 100 of FIG. 6 on the point that phonetic symbols in a non-fixed command set are used. Accordingly, in the case where a sentence is spoken, a process of analyzing the recognition result may be further required (S920).

Except for this point, S900 to S950 are not greatly different from S600 to S650 in FIG. 6, and thus may be replaced by the contents thereof.

Figure 10:
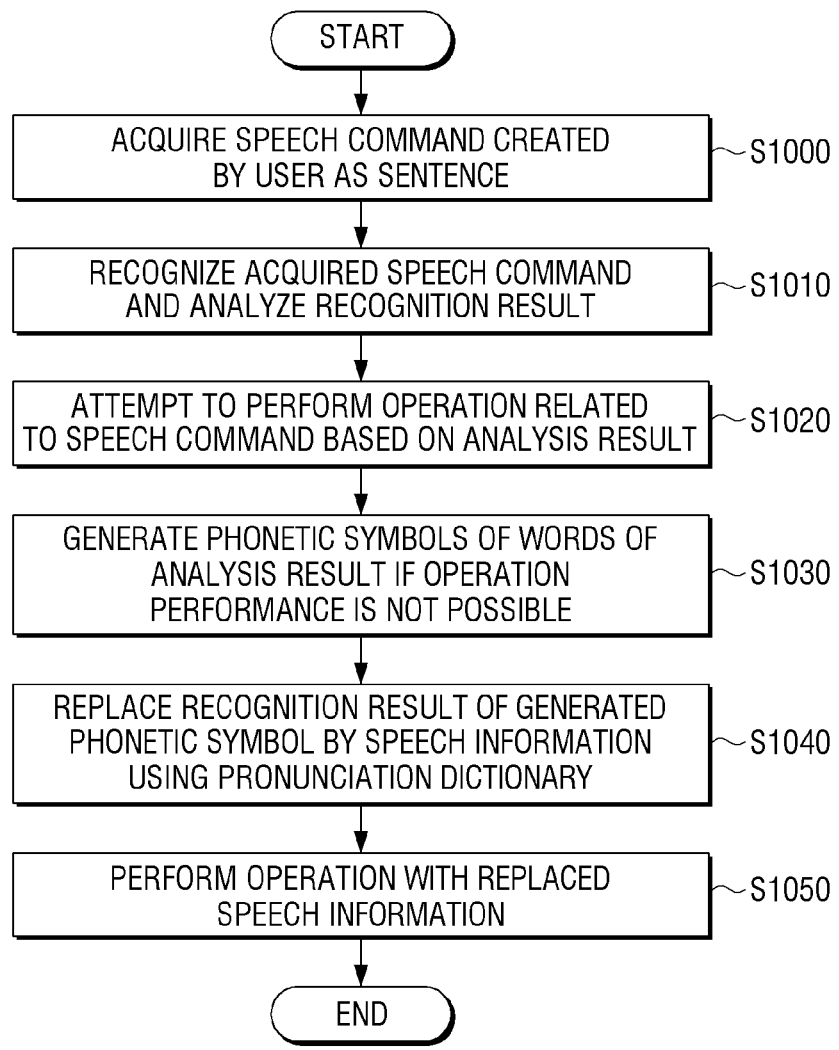
FIG. 10 is a flowchart illustrating a process of driving an image display apparatus that performs an operation with respect to a sentence-type speech command that does not exist in a command set and a non-fixed command set.

FIG. 10 is a flowchart illustrating a process of driving an image display apparatus that performs an operation with respect to a sentence-type speech command that does not exist in a command set and a non-fixed command set.

Comparing FIG. 10 with FIG. 7, an image display apparatus 100 according to an embodiment of the present disclosure replaces the recognition result by new speech information, that is, a text, using phonetic symbols for the recognition result and a pronunciation dictionary if a word that is spoken as a sentence does not exist in at least one of a command set and a non-fixed command set.

Except for this point, S1000 to S1050 are not greatly different from S700 to S750 in FIG. 7, and thus may be replaced by the contents thereof.

Up to now, referring to FIGS. 1 to 10, format normalization of the speech recognition result that is performed by the image display apparatus 100 according to an embodiment of the present disclosure has been described. Here, format normalization means that a predetermined rule is made to process the speech recognition result.

However, the image display apparatus 100 may perform different operations depending on whether the created speech command is a word or a sentence. Further, the image display apparatus 100 may perform different operations depending on whether to use a fixed speech engine in the image display apparatus 100, a spontaneous speech engine, or both the two engines. "Further, if operation performance is not possible as the result of attempting to perform the operation related to the speech command as the recognition result, the image display apparatus 100 may perform different operations depending on whether to use a preset fixed command set, a non-fixed command set, or a pronunciation dictionary. As described above, according to embodiments of the present disclosure, setting can be made for various situations, or the corresponding operation can be performed in accordance with the determination result through a separate determination process. Since this can be sufficiently analogized by the above-described contents, further explanation thereof will be omitted.

On the other hand, although it is explained that all constituent elements that constitute an embodiment of the present disclosure are combined into one or operate in combination, it is not necessary that the present disclosure is limited to such an embodiment. That is, within the purpose range of the present disclosure, one or more of all the constituent elements may be selectively combined to be operated. Further, although all the constituent elements can be implemented by independent hardware, a part or the whole of the constituent elements may be selectively combined, and may be implemented as a computer program having program modules that perform a part or the whole of the functions that are combined in one or plural hardware configurations. Codes and code segments that constitute the computer program may be easily induced by skilled in the art the present disclosure pertains. Such a computer program may be stored in a non-transitory computer readable recording medium, and then may be read and executed by the computer to implement the embodiment of the present disclosure.

Here, the non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While the disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. An image display apparatus comprising:
a microphone configured to obtain a speech command;
a storage configured to
store a command set comprising a plurality of commands and a phonetic symbol corresponding to each of the plurality of commands,
store a pronunciation dictionary comprising native language having same pronunciation as foreign language and the foreign language having same pronunciation as the native language, and
store exceptional phonetic symbol information that matches phonetic symbols of the native language with phonetic symbols of the foreign language, wherein the phonetic symbols of the native language and the foreign language have a same pronunciation and a differently inscribed phonetic symbol; and a processor configured to
generate a phonetic symbol of a text-based recognition result corresponding to the obtained speech command,
compare the phonetic symbol of the text-based recognition result with the stored phonetic symbol corresponding to each of the plurality of commands,
based on a comparison result indicating that the phonetic symbol of the text-based recognition result does not match the stored phonetic symbol and that a portion of the phonetic symbol of the text-based recognition result matches one of the phonetic symbols of the native language and the foreign language, obtain text information corresponding to the obtained speech command by replacing the portion of the phonetic symbol of the text-based recognition result using the pronunciation dictionary and the exceptional phonetic symbol information, and
perform an operation corresponding to the obtained text information to control the image display apparatus.

2. The image display apparatus as claimed in claim 1, further comprising:
a display to display content, and
wherein the storage is further configured to store content-related words displayed on the display as commands and to store the phonetic symbols by matching the phonetic symbols with the stored commands, respectively, and
wherein the processor obtains a command that is non-fixedly stored in the storage as the text information.

3. The image display apparatus as claimed in claim 1, wherein if the speech command is a sentence, the processor recognizes the sentence, analyzes the recognition result, and obtains the text information based on the analysis result and the phonetic symbol.

4. The image display apparatus as claimed in claim 1, wherein the processor removes at least one of a space and a special symbol from the phonetic symbol that is generated as the recognition result, and then obtains the text information having a coincident phonetic symbol.

5. The image display apparatus as claimed in claim 1, wherein the processor attempts to perform an operation related to the speech command as a result of recognizing the obtained speech command, and obtains the text information which has a phonetic symbol that is the same as or similar to a phonetic symbol of the recognition result if the operation is unable to be performed as the result of attempt.

6. A method for driving an image display apparatus comprising:
storing a command set comprising a plurality of commands and a phonetic symbol corresponding to each of the plurality of commands in a DB;
storing a pronunciation dictionary comprising native language having same pronunciation as foreign language and the foreign language having same pronunciation as the native language;
storing exceptional phonetic symbol information that matches phonetic symbols of the native language with phonetic symbols of the foreign language, wherein the phonetic symbols of the native language and the foreign language have a same pronunciation and a differently inscribed phonetic symbol;
obtaining a speech command;
generating a phonetic symbol of a text-based recognition result corresponding to the obtained speech command;

comparing the phonetic symbol of the text-based recognition result with the stored phonetic symbol corresponding to each of the plurality of commands;

based on a comparison result indicating that the phonetic symbol of the text-based recognition result does not match the stored phonetic symbol and that a portion of the phonetic symbol of the text-based recognition result matches one of the phonetic symbols of the native language and the foreign language, obtaining text information corresponding to the obtained speech command by replacing the portion of the phonetic symbol of the text-based recognition result using the pronunciation dictionary and the exceptional phonetic symbol information; and performing an operation corresponding to the obtained text information to control the image display apparatus.

7. The method as claimed in claim 6, further comprising:
displaying content on a display; and
storing, in the DB, content-related words displayed on the display as commands and storing the phonetic symbols by matching the phonetic symbols with the stored commands respectively,
wherein a command that is non-fixedly stored in the DB is obtained as the text information.

8. The method as claimed in claim 6, wherein if the speech command is a sentence, the obtaining the text information recognizes the sentence, analyzes the recognition result, and obtains the text information based on the analysis result and the phonetic symbol.

9. The method as claimed in claim 6, wherein the obtaining the text information removes at least one of a space and a special symbol from the phonetic symbol that is generated as the recognition result, and then obtains the text information having a coincident phonetic symbol.

10. The method as claimed in claim 6, wherein the obtaining the text information attempts to perform an operation related to the speech command as a result of recognizing the obtained speech command, and obtains the text information which has a phonetic symbol that is the same as or similar to a phonetic symbol of the recognition result if the operation is unable to be performed as the result of attempt.

11. A non-transitory computer readable recording medium including a program for executing a method for driving an image display apparatus, wherein the method for driving the image display apparatus comprises:

storing a command set comprising a plurality of commands and a phonetic symbol corresponding to each of the plurality of commands;

storing a pronunciation dictionary comprising native language having same pronunciation as foreign language and the foreign language having same pronunciation as the native language;

storing exceptional phonetic symbol information that matches phonetic symbols of the native language with phonetic symbols of the foreign language, wherein the phonetic symbols of the native language and the foreign language have a same pronunciation and a differently inscribed phonetic symbol;

obtaining a speech command;

generating a phonetic symbol of a text-based recognition result corresponding to the obtained speech command;

comparing the phonetic symbol of the text-based recognition result with the stored phonetic symbol corresponding to each of the plurality of commands;

based on a comparison result indicating that the phonetic symbol of the text-based recognition result does not match the stored phonetic symbol and that a portion of the phonetic symbol of the text-based recognition result matches one of the phonetic symbols of the native language and the foreign language, obtaining text information corresponding to the obtained speech command by replacing the portion of the phonetic symbol of the text-based recognition result using the pronunciation dictionary and the exceptional phonetic symbol information; and performing an operation corresponding to the obtained text information to control the image display apparatus.

12. The computer readable recording medium as claimed in claim 11, wherein the obtaining the text information comprises removing at least one of a space and a special symbol from the phonetic symbol that is generated as the recognition result, and obtaining text information having a coincident phonetic symbol.

13. The computer readable recording medium as claimed in claim 11, wherein if the speech command is a sentence, the obtaining the text information recognizes the sentence, analyzes the recognition result, and obtains the text information based on the analysis result and the phonetic symbol.

* * * * *